United States Patent [19]

Sano

[11] Patent Number: 5,317,334
[45] Date of Patent: May 31, 1994

[54] METHOD FOR DRIVING A PLASMA DISLAY PANEL

[75] Inventor: Yoshio Sano, Tokyo, Japan
[73] Assignee: NEC Corporation, Tokyo, Japan
[21] Appl. No.: 800,575
[22] Filed: Nov. 27, 1991
[30] Foreign Application Priority Data Nov. 28, 1990 [JP] Japan .................. 2-327066

[51] Int. Cl.[5] .............................................. G09G 3/22
[52] U.S. Cl. ................................... 345/148; 345/41; 348/687; 348/332
[58] Field of Search ............... 340/771, 793, 767; 358/168, 212; 345/148, 41

[56] References Cited

U.S. PATENT DOCUMENTS 4,097,780  6/1978  Ngo ............................... 340/771

FOREIGN PATENT DOCUMENTS 0444962  4/1991  European Pat. Off. .
1237696  9/1989  Japan .............................. 340/771
2219092  8/1990  Japan .
3019483  1/1991  Japan .

OTHER PUBLICATIONS

Proceedings of the SID., vol. 21, No. 4, 1980, Los Angeles, US, pp. 327–332, H. Murakami et al. "An experimental TV Display using a Gas–Discharge Panel with Internal Memory".

Primary Examiner—Ulysses Weldon
Assistant Examiner—Amare Mengistu

[57] ABSTRACT

A method for driving a plasma display panel is provided, in which one field time is divided into a plurality of sub-field times having different light emitting times from each other. At least one sub-field time is longer than others to have a light emitting time longer than the other sub-field times. In each sub-field time, a state is selected from a light emission state and a non-light emission state to provide a predetermined gradation of an image to be displayed without decreasing light efficiency.

3 Claims, 9 Drawing Sheets

FIG.1 PRIOR ART

- 11 PIXEL
- 3 ROW ELECTRODE
- 4 COLUMN ELECTRODE
- 10 SPACER

FIG.2 PRIOR ART

- 8 DISCHARGE SPACE
- 2 SECOND INSULATING SUBSTRATE
- 4 COLUMN ELECTRODE
- 6 INSULATING LAYER
- 9 FLUORESCENT LAYER
- 10 SPACER
- 7 PROTECTING LAYER
- 5 INSULATING LAYER
- 3 ROW ELECTRODE
- 1 FIRST INSULATING SUBSTRATE

METHOD FOR DRIVING A PLASMA DISLAY PANEL

FIELD OF THE INVENTION

This invention relates to a method for driving a plasma display panel, and more particularly to, a method for driving an AC plasma display panel of dot matrix type used for personal computers, workstations, wall hanging type televisions which are under development, etc.

BACKGROUND OF THE INVENTION

An AC plasma display panel of dot matrix type includes a plurality of row electrodes disposed in parallel each other and a plurality of column electrodes disposed in parallel each other to form a matrix with the row electrodes. In the matrix, a plurality of discharge spaces each corresponding to a pixel are formed. A plurality of the row and column electrodes cross each other in a right angle. Each crossing point forms a pixel. The row electrodes are composed of two groups, one is that of scanning electrodes and the other is that of common electrodes.

In operation, the common electrodes are supplied with maintaining pulses periodically for maintaining discharge in the pixels, respectively. On the other hand, the scanning electrodes are supplied with maintaining pulses periodically in the same timing but different timing with the maintaining pulses, respectively. Each of the scanning electrodes is also supplied with a scanning pulse and an extinguishing pulse in some timing which comes in turn. The column electrodes are supplied with data pulses of positive in accordance with light emission data in the same timing as the scanning pulses supplied to the scanning electrodes. One field for displaying one frame is divided to a plurality of sub-fields, and light emission time by discharge in each sub-field is controlled to display gradation of brightness of the pixels. If one field is divided to six sub-fields, gradation of brightness of the pixels becomes $2^6=64$ grades. The gradation of 64 grades in each pixel can be realized by selecting one state from light emission and non-light emission in each sub-field. This conventional method is described on pages 13 to 18 of "The technical report of the television institute" published on Nov. 22, 1984.

According to the conventional method for driving a plasma display panel, however, there is a disadvantage in that light emission efficiency of pixels is relatively low, because no light emission times are long compared with light emission times in one field. It is supposed that one field is divided to six sub-fields each having equal sub-field time $T_s$, and the six sub-fields have different light emission times of T, T/2, T/4, T/8, T/16 and T/32, respectively. If the first emission time T is equal to the sub-field time $T_s$, the maximum light emission efficiency becomes $(1+1/2+1/4+1/8+1/16+1/32)T/6T_s=0.328$, that is 32.8%. Therefore, remaining time which is 67.2% of the whole field time is consumed idly.

SUMMARY OF THE INVENTION

Accordingly, it is an object of the invention to provide a method for driving a plasma display panel in which light emission efficiency is improved without increasing a frequency of maintaining pulses.

According to a feature of the invention, a method for driving a plasma display panel comprises the steps of:
dividing a field time to a plurality of sub-field times each having a different light emitting time from others, at least one of the sub-field times being longer than others to have a light emitting time longer than the others;
selecting a condition from light emitting and non-light emitting conditions at each light emitting time of each sub-field time to provide a predetermined gradation to an image to be displayed; and
scanning one field by supplying scanning pulses to a plurality of scanning electrodes in accordance with the condition selected by the predetermined gradation.

BRIEF DESCRIPTION OF THE DRAWINGS

The invention will be explained in more detail in conjunction with appended drawings wherein.

DESCRIPTION OF THE PREFERRED EMBODIMENTS

Before describing a method for driving a plasma display panel in preferred embodiments according to the invention, the conventional method for driving a plasma display panel described before will be explained.

Figure 1:
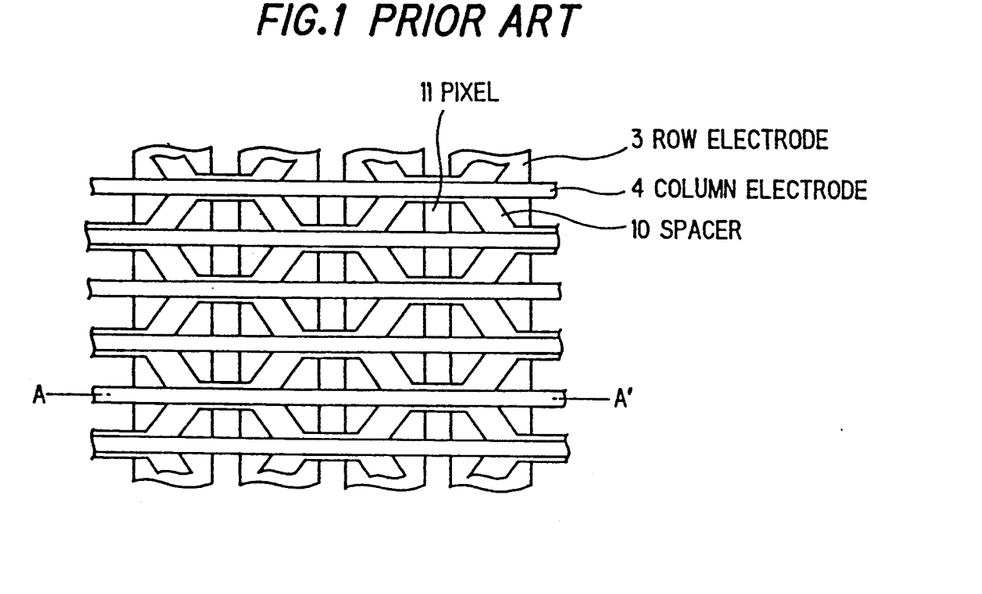
FIG. 1 is a fragmentary plan view illustrating a plasma display panel.
Figure 2:
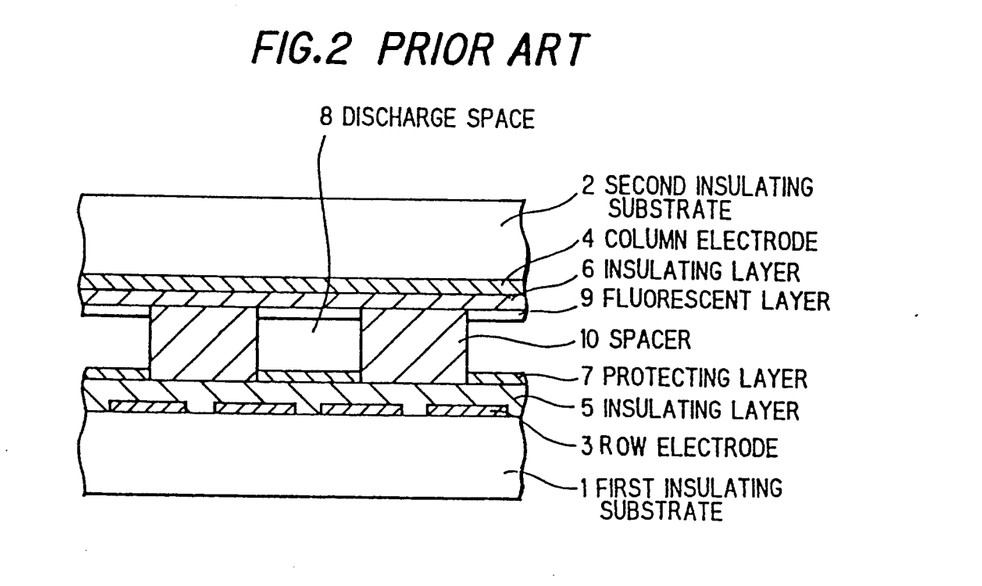
FIG. 2 is a fragmentary cross-sectional view taken on line A—A' of FIG. 1.

FIGS. 1 and 2 show a conventional AC plasma display panel of dot matrix type. The plasma display panel includes first and second insulating substrates 1 and 2 supported in parallel by a spacer 10 with a predetermined distance, a plurality of row electrodes 3 disposed in parallel each other on the first insulating substrate 1, a plurality of column electrodes 4 disposed in parallel each other to form a matrix with the row electrodes 3, insulating layers 5 and 6 respectively covering the row and column electrodes 3 and 4 of the first and second insulating substrates 1 and 2, a protecting layer 5 covering the insulating layer 5 of the first insulating substrate 1, and a fluorescent layer 9 provided on the insulating layer 6 of the second insulating substrate 2. A plurality of discharge spaces 8 each corresponding to a pixel 10 are formed.

Figure 3:
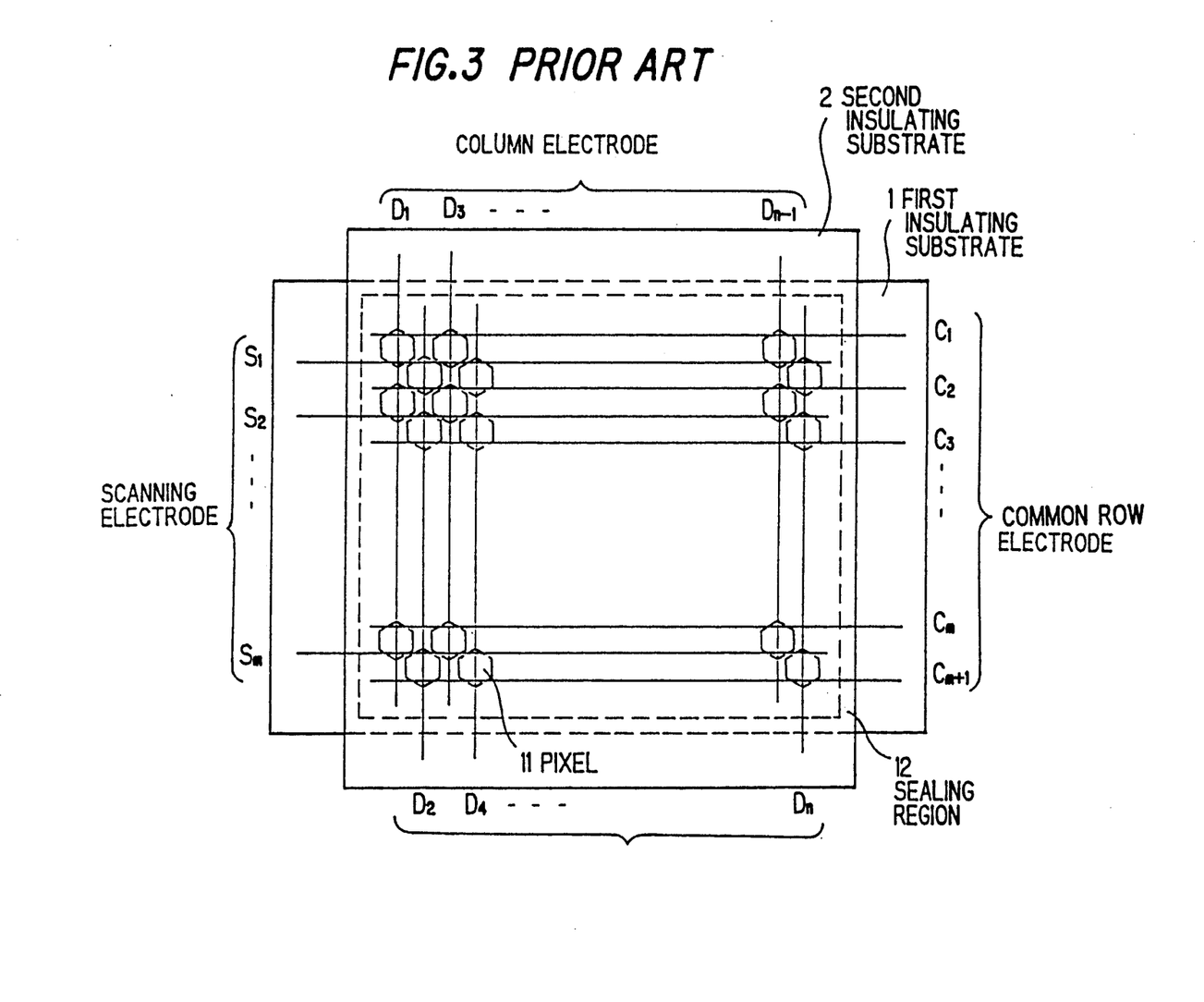
FIG. 3 is an explanatory plan view illustrating arrangement of electrodes of the plasma display panel.

FIG. 3 shows arrangement of electrodes of the plasma display panel. A plurality of the row and column electrodes cross each other in a right angle. Each crossing point forms a pixel 11. The row electrodes 3 are composed of two groups, one is that of scanning electrodes $S_1$ to $S_m$ and the other is that of common electrodes $C_1$ to $C_{m+1}$. The matrix region is sealed by a sealing region 12.

Figure 4:
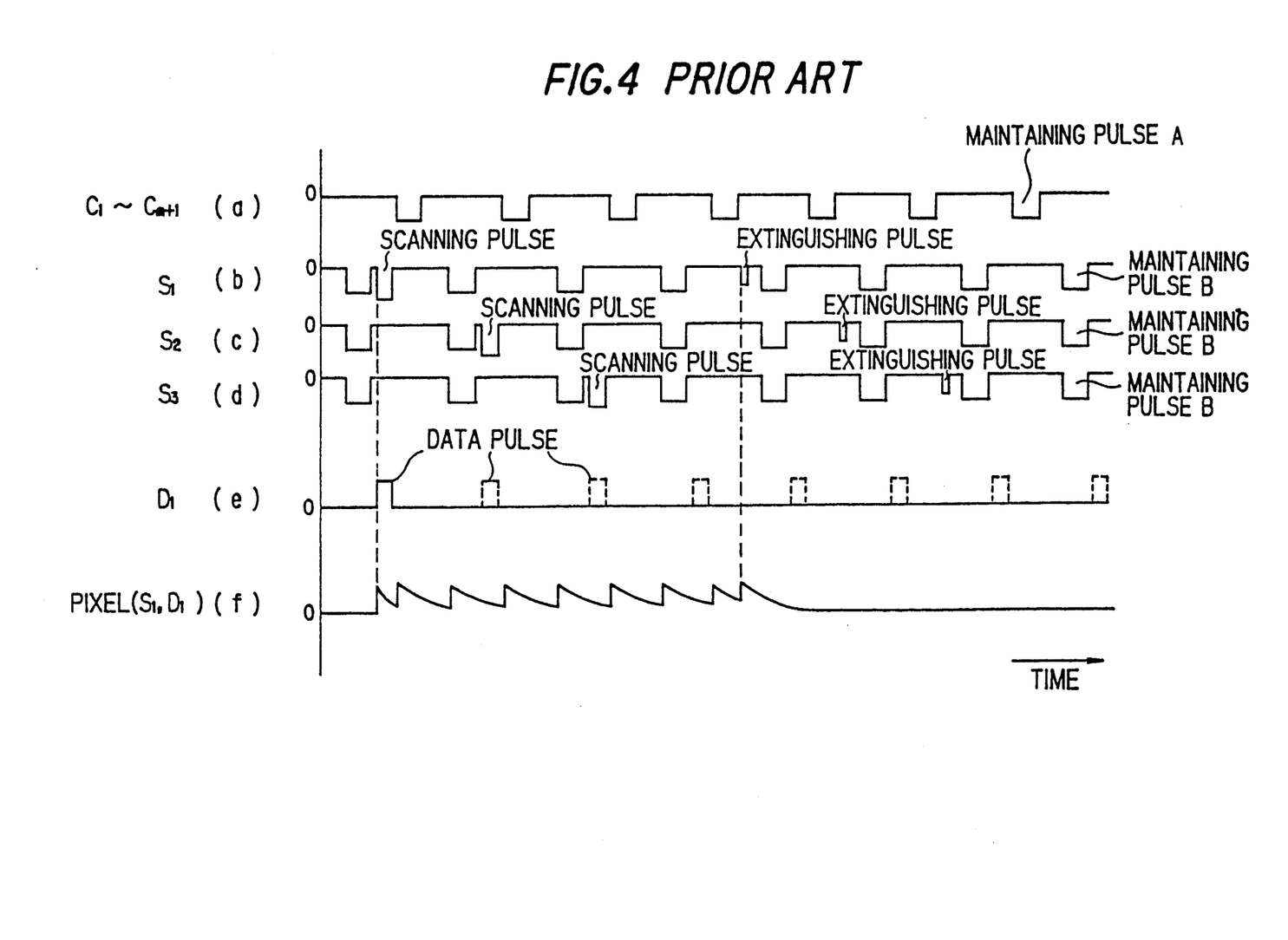
FIG. 4 is a timing chart of signals in a conventional method for driving a plasma display panel.

FIG. 4 shows a timing chart of signals in a conventional method for driving a plasma display panel. The common electrodes $C_1$ to $C_{m+1}$ are supplied with maintaining pulses. A periodically for maintaining discharge in the pixels 11, respectively. On the other hand, the scanning electrodes $S_1$ to $S_m$ are supplied with maintaining pulses B periodically in the same timing but different timing of the maintaining pulses A supplied to the common electrodes $C_1$ to $C_{m+1}$, respectively. Each of the scanning electrodes $S_1$ to $S_m$ is also supplied with a scanning pulse and an extinguishing pulse in different timings which comes in turn. The column electrodes $D_1$ to $D_m$ are supplied with data pulses of positive in accordance with light emission data in the same timing as the scanning pulses supplied to the scanning electrodes $S_1$ to $S_m$. In order to make a light emission of a pixel ($S_1$, $D_1$) which is positioned on a crossing point of the scanning and column electrodes $S_1$ and $D_1$, a data pulse of positive is supplied to the column electrode $D_1$ synchronized with a scanning pulse supplied to the scanning electrode $S_1$, shown as (e) of FIG. 4. Accordingly, a discharge occurs in the pixel ($S_1$, $D_1$) to make a light emission, shown as (f) of FIG. 4. This light emission is maintained by supplying the maintaining pulses A and B periodically to the scanning and column electrodes $S_1$ and $D_1$, however, the light emission terminates when an extinguishing pulse having a narrow width and a low voltage is supplied to the scanning electrode $S_1$. In the same manner, light emission operations of every pixels of the plasma display panel are carried out.

Figure 5:
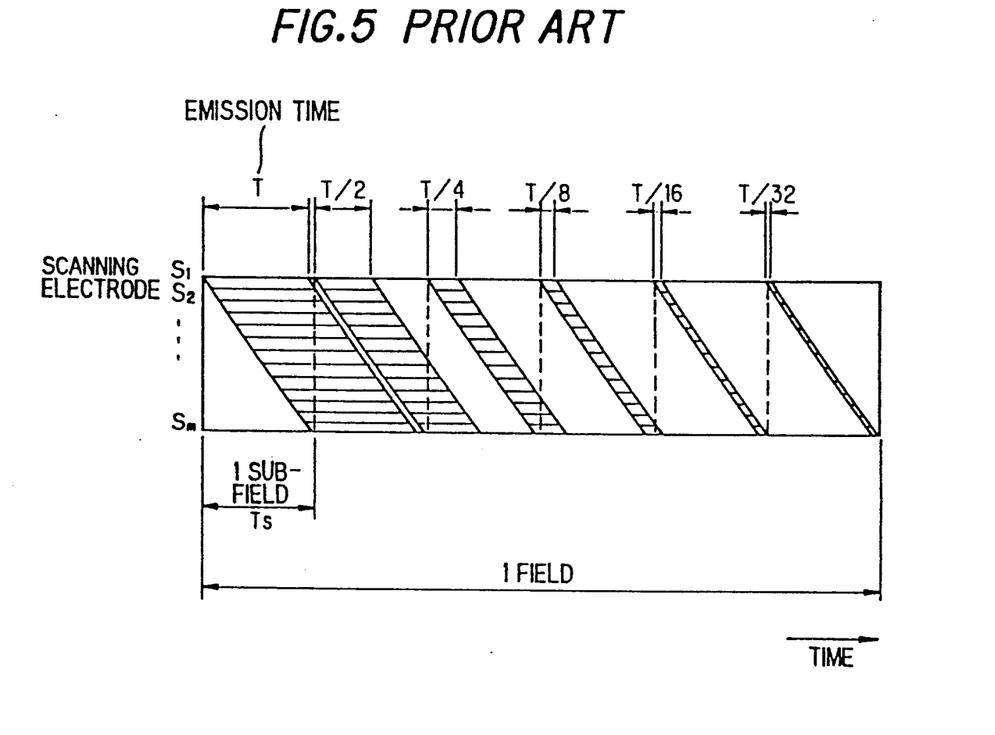
FIG. 5 is a timing chart of light emission in the conventional method for driving a plasma display panel.

FIG. 5 shows timing of light emission in the conventional method for driving a plasma display panel. One field for displaying one frame is divided to a plurality of sub-fields, and light emission time of each sub-field is controlled to display an image with gradation of brightness. In FIG. 5, one field is divided to six sub-fields each having equal time $T_s$, and gradation of brightness becomes $2^6 = 64$ grades. The sub-fields have different light emission times of T, T/2, T/4, T/8, T/16 and T/32, respectively. The gradation of 64 grades can be realized by selecting one state from light emission and non-light emission in each sub-field.

Figure 6:
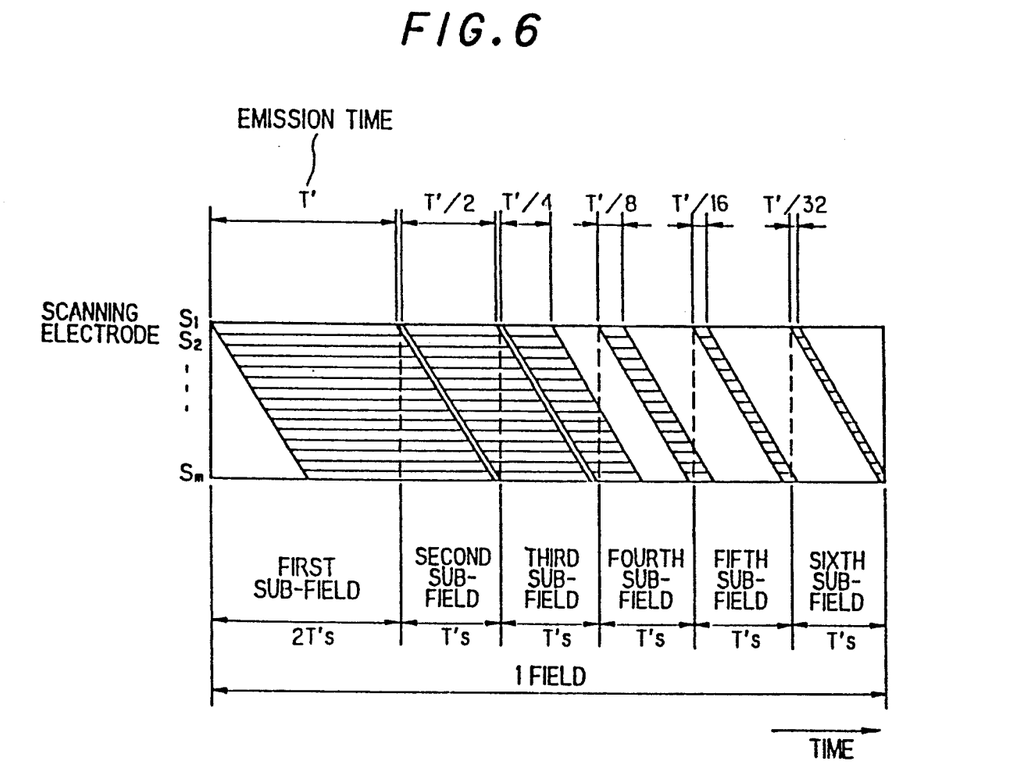
FIG. 6 is a timing chart of light emission in a method for driving a plasma display panel in a first preferred embodiment according to the invention.

Next, a method for driving a plasma display panel in a first preferred embodiment will be explained. In FIG. 6, one field is divided to six sub-fields, and each of the second to sixth sub-fields has equal time $T'_s$ (= 2.38 ms), however, the first sub-field has time 2 $T'_s$. In this case, the number of scanning electrodes is 480, one field time is 1/60 sec. and gradation number is $2^6 = 64$. The sub-fields have different light emission times of T', T'/2, T'/4, T'/8, T'/16 and T'/32. If the first emission time T' is equal to 2 $T_s$, the maximum light emission efficiency becomes $(1+1/2+1/4+1/8+1/16+1/32)$ T'/7 T'$_s$ = 0.563, that is 56.3%, so that the emission efficiency becomes approximately twice as that of the conventional method shown in FIG. 5.

Figure 7:
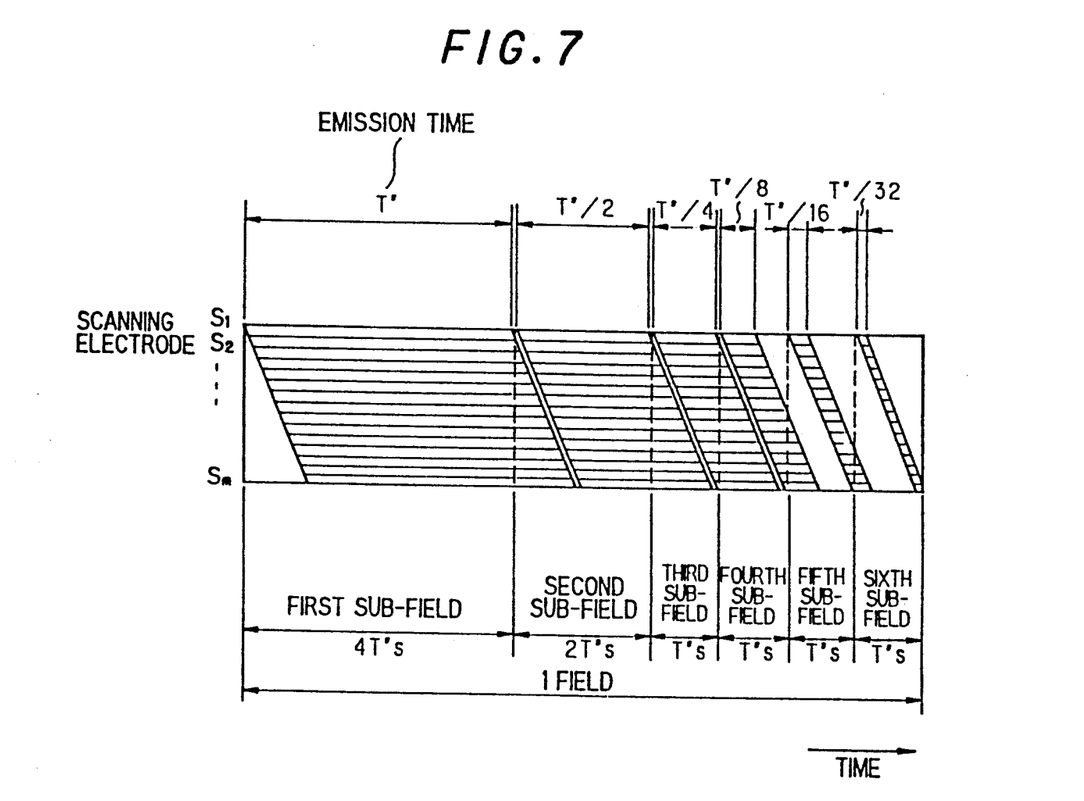
FIG. 7 is a timing chart of light emission in a method for driving a plasma display panel in a second preferred embodiment according to the invention.

Next, a method for driving a plasma display panel in a second preferred embodiment will be explained. In FIG. 7, one field is divided to six sub-fields, and each of the third to sixth sub-fields has equal time $T''_s$ (= 1.67 ms), however, the first sub-field has time 4 $T''_s$ and the second sub-field has time 2$T''_s$. The sub-fields have different light emission times of T'', T''/2, T''/4, T''/8, T''/16 and T''/32, respectively. If the first emission time T'' is equal to $4T''_s$, the maximum light emission efficiency becomes $(1+1/2+1/4+1/8+1/16+1/32)$T''/10T''$_s$ = 0.788, that is 78.8%, so that the emission efficiency becomes more improved compared with that in the first preferred embodiment shown in FIG. 6.

In this embodiment, however, the scanning time during which all of the scanning electrodes are scanned becomes relatively short. If one field time is 1/60 sec., the scanning time which is approximately equal to $T''_s$ becomes 1.67 ms, compared with 2.78 ms in the conventional method shown in FIG. 5. Therefore, the intervals of the scanning pulses as well as those of the maintaining pulses should be short. However, if the intervals of the maintaining pulses become short and the frequency thereof becomes high, the light emission efficiency may decrease, or power consumption having no contribution to light emission may increase, because currents for charging and discharging electrostatic capacity of the panel increase in proportion to the frequency of the maintaining pulses. Further, the pulse width of the scanning and maintaining pulses becomes narrow to cause instability of the discharge if the frequency of the maintaining pulses increases.

Figure 8:
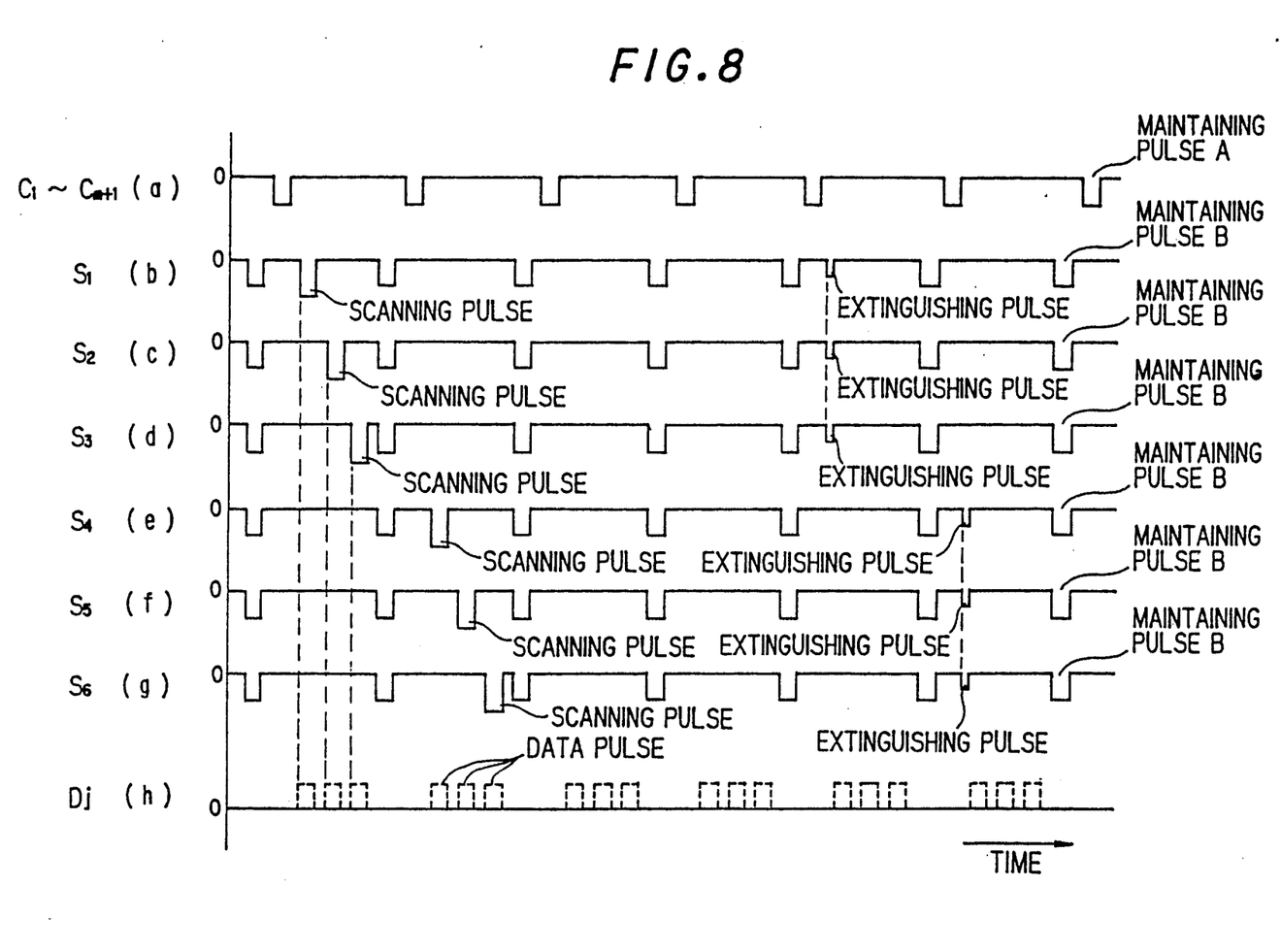
FIG. 8 is a timing chart of signals in the method for driving a plasma display panel in a third preferred embodiment according to the invention.

FIG. 8 shows timing of signals in a method for driving a plasma display panel in a third preferred embodiment according to the invention. In this embodiment, scanning electrodes $S_1$ to $S_m$ are divided to a plurality of groups. Each group includes several scanning electrodes, though FIG. 8 shows a case of three electrodes. Each of the scanning electrodes $S_1$ to $S_3$ is supplied with a scanning pulse in turn at a different timing with the two others between the same interval of two maintaining pulses, then is supplied with an extinguishing pulse at the same timing with the two others. Each of the scanning electrodes $S_4$ to $S_6$ is also supplied with a scanning pulse and an extinguishing pulse, as shown in FIG. 8. In this case, the frequency of the maintaining pulses is sufficient to be one third of that in case of the conventional method. In addition, the pulse width of the maintaining and scanning pulses can be large. In FIG. 8, the pulse width of the maintaining pulses A and B is 1.5 micro seconds, and the pulse width of the scanning pulse is 2.5 micro seconds. Data pulses are supplied to a column electrode D, synchronized with each scanning pulse supplied to each scanning electrode.

Table 1 shows frequencies of the pulses, the time using ratio, and the relative brightness in the conventional method and the methods in the first and second preferred embodiments, respectively.

TABLE 1

|  | FREQUENCY | EFFI-CIENCY | BRIGHT |
| --- | --- | --- | --- |
| CONVENTIONAL METHOD | 1 | 32.8% | 32.8 |
| EXEMPLIFIED METHOD 1 | 7/6 = 1.17 | 56.3% | 65.9 |
| EXEMPLIFIED METHOD 2 | (7/6)/2 = 0.583 | 56.3% | 32.8 |
| EXEMPLIFIED METHOD 3 | (10/6)/3 = 0.556 | 78.8% | 43.8 |
| EXEMPLIFIED METHOD 4 | (10/6)/2 = 0.833 | 78.8% | 65.6 |

Where, "FREQUENCY" represents the frequency of the maintaining pulses, "EFFICIENCY" represents the time using efficiency corresponding to a ratio of the maximum light emission time in one field time, and "BRIGHT" represents the relative brightness. "EXEMPLIFIED METHOD 1" represents the first preferred embodiment, "EXEMPLIFIED METHOD 2" represents combination of the first and third preferred embodiments in which the scanning electrodes are divided to pairs each of which is supplied with two scanning pulses in turn in the same interval between two maintaining pulses, "EXEMPLIFIED METHOD 3" represents combination of the second and third preferred embodiments in which the scanning electrodes are divided to pairs each of which is supplied with three scanning pulses in turn in the same interval between two maintaining pulses, and "EXEMPLIFIED METHOD 4" represents combination of the second and third preferred embodiments in which the scanning electrodes are divided to pairs each of which is supplied with two scanning pulses in turn in the same interval between two maintaining pulses.

As understood by Table 1, the driving frequency becomes 1.17 times of that in the conventional method and the brightness becomes twice thereof in EXEMPLIFIED METHOD 1. In EXEMPLIFIED METHOD 2, the brightness remains equal to that in the conventional method, however, the frequency of the maintaining pulses becomes half of that in the conventional method, so that the power consumption required for charging and discharging of electrostatic capacity of the panel becomes half thereof. In EXEMPLIFIED METHOD 3, the frequency of the maintaining pulses becomes half of that in the conventional method, and moreover, the brightness is improved as compared with that in the conventional method. In EXEMPLIFIED METHOD 4, the frequency of the maintaining pulses becomes 0.8 times of that in the conventional method, and the brightness becomes twice thereof.

Figure 9:
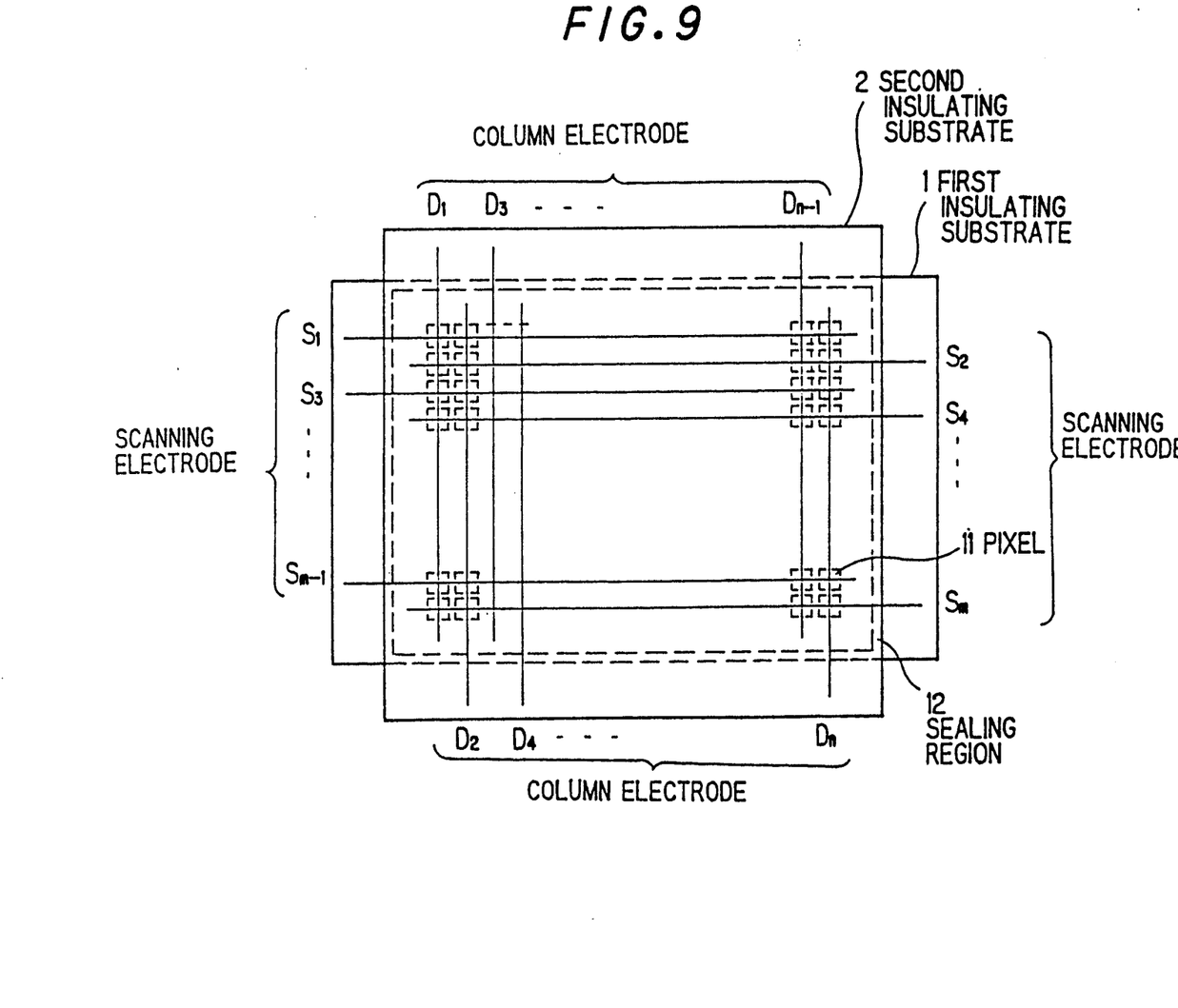
FIG. 9 is an explanatory plan view illustrating arrangement of electrodes of a plasma display panel of opposite electrode type.
Figure 10:
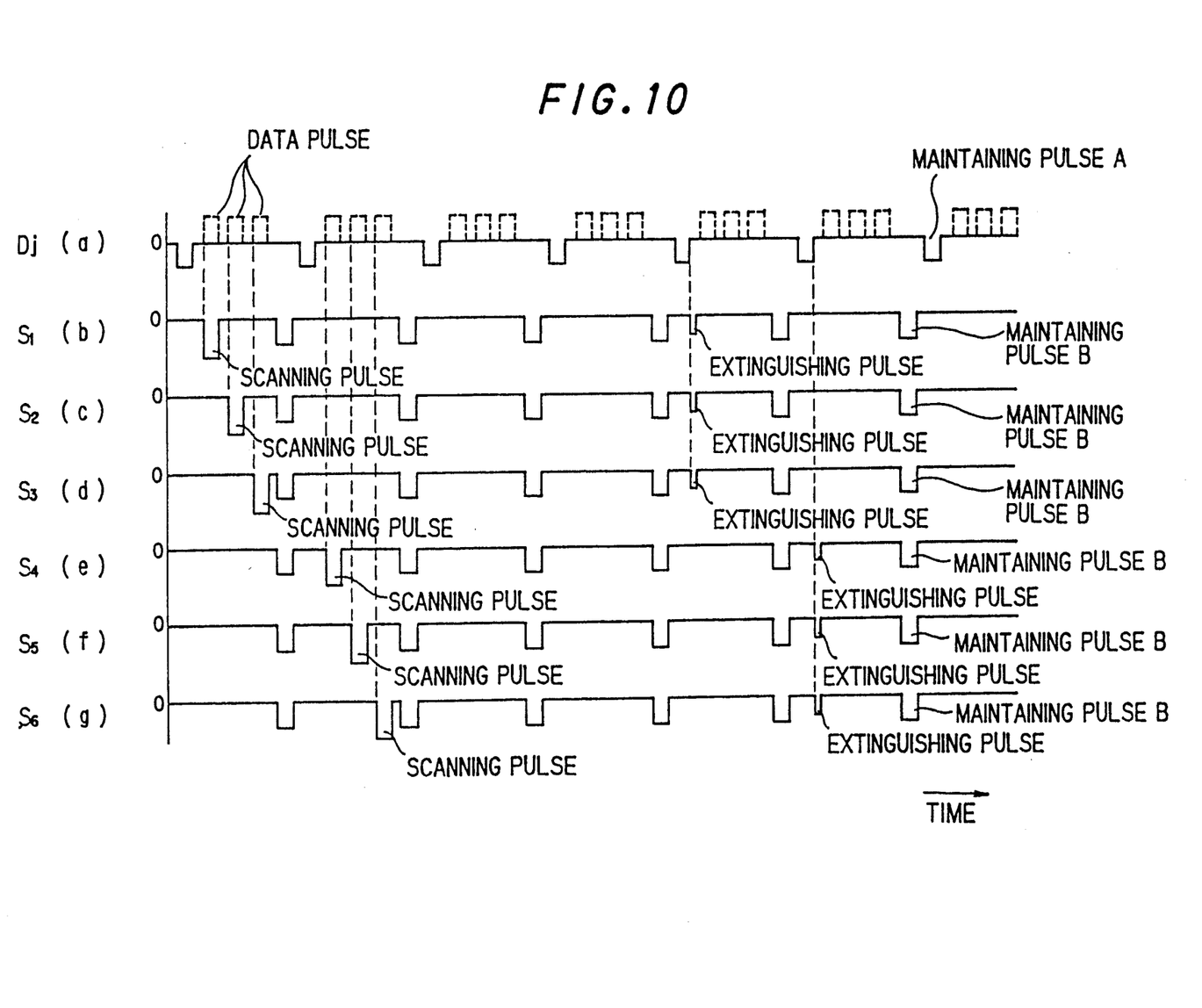
FIG. 10 is a timing chart of signals in the plasma display panel of opposite electrode type.

As explained above, the method can be used for driving a plasma display panel as shown in FIGS. 1 to 3, however, the method can be also used for driving a plasma display panel of opposite electrode type in which row electrodes have only scanning electrodes as shown in FIG. 9. FIG. 10 shows timing of signals in the plasma display panel of opposite electrode type. The timings of the signals are the same as those in FIG. 8.

This method may be adopted in a so called dividing driving method in which scanning electrodes are divided to two groups such that the scanning electrodes are alternately led out from opposed ends of the panel and column electrodes are divided to two groups such that all column electrodes are separated at central region of the panel so as to be led out from opposed ends of the panel, respectively. In addition, this method may be adopted in a so called interlace method in which one frame consists of two fields.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A method for driving a plasma display panel, comprising the steps of:

dividing a field time to a plurality of sub-field times each having a different light emitting time from others, at least one of said sub-field times being longer than others to have a light emitting time longer than that of others;

selecting a condition from light emitting and non-light emitting conditions at each light emitting time of each sub-field to provide a predetermined gradation to an image to be displayed;

supplying maintaining pulses to a plurality of scanning electrodes with a predetermined time interval;

scanning one field by supplying scanning pulses to said plurality of scanning electrodes in accordance with said condition selected by said predetermined gradation wherein at least two scanning pulses are supplied to each of at least two electrodes of said scanning electrodes in turn within one and the same interval of maintaining pulses so as to suppress a frequency of maintaining pulses low; and supplying at least two extinguishing pulses to said at least two of said scanning electrodes, respectively, at the same timing in one interval of said maintaining pulses to cease light emission.

2. A method for driving a plasma display panel, according to claim 1, wherein:

said dividing step comprises dividing a field time to a plurality of sub-field times in which the first sub-field time has the longest time period to provide the longest light emitting time being twice as long as other sub-field times.

3. A method for driving a plasma display panel, according to claim 1, wherein:

said dividing step comprises dividing a field time to a plurality of sub-field times in which the first and second sub-field times have the first and second longest time periods to provide the first and second longest light emitting times being four and two times, respectively, longer than other sub-field times.

* * * * *

UNITED STATES PATENT AND TRADEMARK OFFICE
CERTIFICATE OF CORRECTION

PATENT NO. : 5,317,334
DATED : May 31, 1994
INVENTOR(S) : Yoshio Sano

It is certified that error appears in the above-identified patent and that said Letters Patent is hereby corrected as shown below:

On title page, item [54] and col. 1, line 1, title should read:

--METHOD FOR DRIVING A PLASMA DISPLAY PANEL--.

Signed and Sealed this

Sixteenth Day of August, 1994

Attest:

BRUCE LEHMAN

Attesting Officer

Commissioner of Patents and Trademarks